United States Patent [19]

Beffa et al.

[11] 4,219,473
[45] Aug. 26, 1980

[54] SUBSTITUTED UNSYMMETRICAL AZO, AZOMETHINE 1:2 CHROMIUM COMPLEXES

[75] Inventors: Fabio Beffa, Riehen; Eginhard Steiner, Füllinsdorf, both of Switzerland

[73] Assignee: Ciba-Geigy Corporation, Ardsley, N.Y.

[21] Appl. No.: 859,507

[22] Filed: Dec. 9, 1977

Related U.S. Application Data

[63] Continuation of Ser. No. 727,928, Sep. 29, 1976, abandoned, which is a continuation of Ser. No. 528,296, Nov. 29, 1974, abandoned.

[51] Int. Cl.$^2$ .............. C09B 45/16; D06P 1/10; D06P 3/14; D06P 3/24
[52] U.S. Cl. .............. 260/151; 260/146 R; 260/148; 260/149; 260/438.5 R
[58] Field of Search .......... 260/145 A, 145 B, 146 R, 260/148, 149, 151

[56] References Cited

U.S. PATENT DOCUMENTS

| 2,855,393 | 10/1958 | Schetty et al. | 260/145 |
| 2,985,646 | 5/1961 | Schetty et al. | 260/145 |
| 3,391,132 | 7/1968 | Beffa et al. | 260/145 |
| 3,516,980 | 6/1970 | Dore et al. | 260/145 |
| 3,526,617 | 9/1970 | Fuchs et al. | 260/145 |

*Primary Examiner*—Floyd D. Higel
*Attorney, Agent, or Firm*—Edward McC. Roberts

[57] ABSTRACT

1:2 Chromium complex dyes of the formula

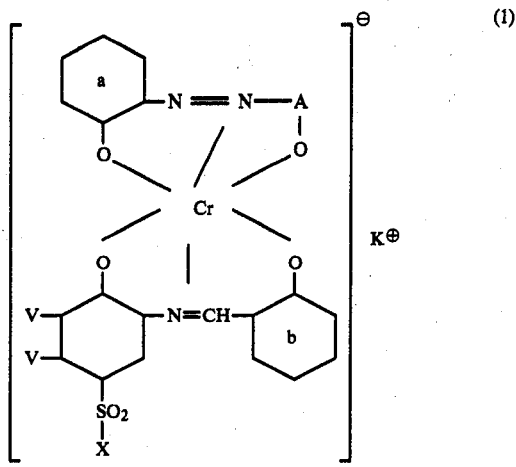

(1)

wherein A represents the radical of a phenol substituted by alkyl and/or acylamino or of a 2-naphthol optionally substituted by acylamino, one V represents hydrogen and the other hydrogen or nitro, X is aryl, an aliphatic or araliphatic radical or an optionally substituted amino group and wherein the benzene ring a can be substituted by halogen, cyano, nitro, acylamino, low molecular alkyl, low molecular alkoxy, sulphonamide and sulphone groups, and the benzene ring b can carry a further fused benzene ring or can be substituted by halogen, nitro, low molecular alkyl or alkoxy and arylazo groups, and wherein K$^+$ represents a cation.

1 Claim, No Drawings

SUBSTITUTED UNSYMMETRICAL AZO, AZOMETHINE 1:2 CHROMIUM COMPLEXES

This is a continuation of application Ser. No. 727,928, filed Sept. 29, 1976 (now abandoned), which is a continuation of application Ser. No. 528,296, filed Nov. 29, 1974 (now abandoned).

The present invention provides 1:2 chromium complex dyes of the formula (1)

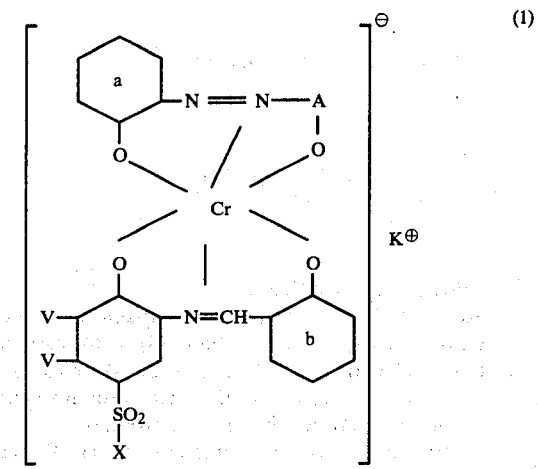

wherein A represents the radical of a phenol which couples in ortho-position to the hydroxy group and is substituted by low molecular alkyl groups and/or acylamino groups or of a 2-naphthol which is optionally substituted in 8-position by an acylamino group, both substituents V represent hydrogen or the one represents a nitro group and the other represents hydrogen, X represents a low molecular aliphatic or araliphatic radical, an aryl radical or an amino groups of the formula

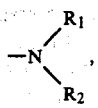

in which $R_1$ represents hydrogen or a low molecular aliphatic radical and $R_2$ represents hydrogen, a low molecular aliphatic radical, a cycloaliphatic or an araliphatic radical or a phenyl or naphthyl radical which is optionally substituted by non-ionogenic substituents, and $R_1$ and $R_2$ together with the nitrogen atom can also form a heterocyclic ring and wherein the benzene ring a can be substituted by halogen, cyano, nitro, acylamino, low molecular alkyl, low molecular alkoxy, sulphonamide and sulphone groups, and the benzene ring b can carry a further fused benzene ring or can be substituted by halogen, nitro, low molecular alkyl or alkoxy and arylazo groups, and wherein K+ represents a cation. A and the benzene ring a are devoid of —$SO_3H$— and —COOH groups.

The term "acrylamino" denotes herein amino groups which are substituted by acyl radicals of aliphatic or aromatic sulphonic acids and, in particular, carboxylic acids, or of carbonic acid monoalkyl or monoaryl esters. The term "acyl" therefore comprises lower alkanoyl, alkoxycarbonyl and alkylsulphonyl groups, for example the acetyl, chloroacetyl, propionyl, butyryl, methoxycarbonyl, ethoxycarbonyl, methylsulphonyl or ethylsulphonyl group, as well as aroyl, aryloxycarbonyl and arylsulphonyl groups, for example the benzoyl, chlorobenzoyl, methylbenzoyl, nitrobenzoyl, phenoxycarbonyl, phenylsulphonyl or p-methylphenylsulphonyl group. The term "aryl" denotes herein primarily the phenyl group and also phenyl groups which are substituted by halogen, such as chlorine or bromine, nitro, lower alkyl or lower alkoxy groups.

Preferred acylamino groups are lower alkanoylamino, alkoxycarbonylamino or optionally substituted benzoylamino groups.

The term "lower" used to qualify alkyl, alkoxy, alkanoly and alkoxycarbonyl, signifies that these groups possess at most 4 carbon atoms.

The substituent X in formula (1) is preferably a lower alkyl radical which is substituted by halogen atoms, in particular chlorine atoms, or by aryl groups, above all by the phenyl group, for example the methyl, chloromethyl, ethyl or benzyl group, or represents an aryl radical, especially the phenyl group, or, in that case, a phenyl group which is substituted by halogen atoms, e.g. chlorine or bromine atoms, nitro, methyl or methoxy groups.

If X represents the

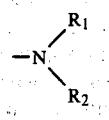

group and $R_1$ and $R_2$ represent an aliphatic radical, the alkyl radicals are primarily optionally substituted, lower straight-chain or branched alkyl groups which can contain substituents, in particular the hydroxy, cyano, lower alkoxy or group or halogen atoms, e.g. chlorine or bromine atoms, for example the methyl, ethyl, isopropyl, tert. butyl, β-hydroxyethyl, β- or γ-hydroxypropyl, β-cyanoethyl, β-methoxyethyl, β-ethoxyethyl, chloromethyl, β-chloroethyl or β-bromoethyl groups.

Where $R_2$ represents a cycloaliphatic group, this is preferably a cycloalkyl group with 5 or 6 carbon atoms, in particular the cyclohexyl group. Where $R_2$ is an araliphatic group, this is above all a benzyl or a phenethyl group.

Where $R_2$ represents a phenyl or a naphthyl radical, it can contain customary non-ionogenic ring substituents. As examples of such substituents, in particular at the phenyl radical, where may be mentioned nitro, halogen, e.g. fluorine, chlorine or bromine, lower alkyl groups, e.g. methyl, or lower alkoxy groups, e.g. methoxy.

Where $R_1$ and $R_2$, together with the nitrogen atom to which they are bonded, and optionally with the inclusion of a further heteroatom, form the radical of a non-aromatic heteroring with 5 or 6 members, such a radical is in particular the pyrrolidino, piperidino or morpholino group.

Advantageously, —$SO_2X$ represents a lower alkylsulphonyl group which is optionally substituted by chlorine or phenyl, the —$SO_2NH_2$ group or a lower N-monosubstituted or a N,N-diusbstituted dialkylsulphonamide group.

Preferred dyes of the formula (1) are those wherein A represents a 2-naphthol or 8-acylamino-2-naphthol radical which is bonded in 1-position and both substituents V represent hydrogen.

The most preferred dyes are those of the formula (2)

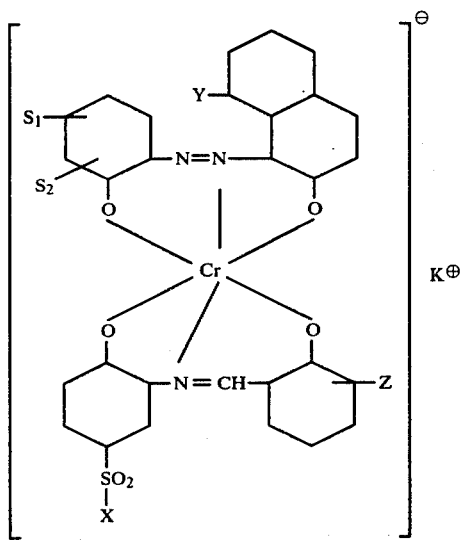

(2)

wherein X and K+ have the meanings assigned to them in formula (1), Y represents a hydrogen atom, a low molecular alkanoylamino or alkoxycarbonylamino group or a benzoylamino group, $S_1$ represents a hydrogen atom or has the same meaning as $S_2$, $S_2$ represents chlorine, bromine, a nitro, cyano, low molecular alkyl, alkoxy, alkanoylamino or alkoxycarbonylamino group, a low molecular alkylsulphonyl group, α-phenylsulphonyl group, the —SO₂NH₂ group or a low molecular N-monoalkylsulphonamido or N,N-dialkylsulphonamido group, and Z represents hydrogen or an arylazo group.

An arylazo radical represented by Z is in particular a phenylazo radical which is optionally substituted by low molecular alkyl, or alkoxy, by nitro or halogen, especially by chlorine or bromine, or is a naphthylazo radical which is preferably bonded in the para-position to the oxygen atom.

The dyes of the formula (1) are obtained by converting a dye of the formula

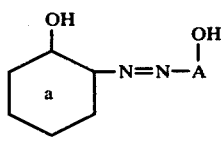

(3)

or also a dye of the formula (4)

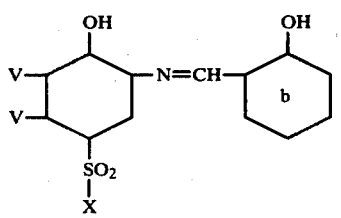

(4)

with a chromium donor into the 1:1 chromium complex and subsequently reacting this with the non-metallisable dye of the formula (4) or (3) to give the 1:2 chromium complex. Preferably the 1:1 complex of the azo dye of the formula (3) is formed first and then added to the azomethine dye. Instead of the azomethine dye of the formula (4), it is also possible to use the corresponding educts, i.e. amines of the formula (5).

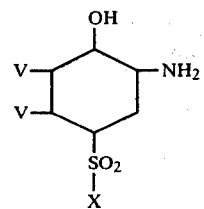

(5)

and aldehydes of the formula (6)

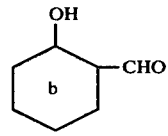

(6)

since these are formed easily.

Instead of the hydroxy groups capable of complex formation, the dyes of the formula (3) or (4) can carry groups which can be converted into metallised substituents, e.g. methoxy groups, provided these are split to form a hydroxy group during the chroming.

The metallisable azo dyes of the formula (3) can be manufactured in known manner by coupling o-hydroxydiazo compounds of the benzene class with phenols which couple in ortho-position, with 2-naphthol or with 8-acylamino-2-naphthol.

Examples of suitable diazo components of dyes of the formula (3) are:

2-amino-1-hydroxybenzene, 2-amino-1-methoxybenzene, 4-chloro- and 4,6-dichloro-2-amino-1-hydroxybenzene, 4- or 5- or 6-nitro-2-amino-1-hydroxybenzene, 4-chloro- and 4-methyl- and 4-acetylamino-6-nitro-2-amino-1-hydroxybenzene, 6-acetylamino- and 6-chloro-4-nitro-2-amino-1-hydroxybenzene, 4-cyano-2-amino-1-hydroxybenzene, 4-methoxy-2-amino-2-amino-1-hydroxybenzene, 2-amino-1-hydroxybenzene, 4-methylsulphone, -ethylsulphone, -propylsulphone and -chloromethylsulphone, 6-chloro- and 6-nitro-2-amino-1-hydroxybenzene-4-methylsulphone, 2-amino-1-hydroxybenzene-4- or -5-sulphamide, 2-amino-1-hydroxybenzene-4- or -5-sulph-N-methyl- and -sulph-N-β-hydroxyethylamide, 2-amino-1-methoxybenzene-4-sulphanilide, 2-amino-1-hydroxybenzene-4-sulphanilide or 4-amino-3-hydroxy-diphenylsulphone.

Examples of suitable coupling components of dyes of the formula (3) are: β-naphthol, 8-acetylamino-2-hydroxynaphthalene, 8-chloroacetylamino-2-hydroxynaphthalene, 8-methoxycarbonylamino-2-hydroxynaphthalene, 8-benzoylamino-2-hydroxynaphthalene, 8-(p-chlorobenzoylamino)-2-hydroxynaphthalene, 8-methylsulphonylamino-2-hydroxynaphthalene, 8-ethoxycarbonylamino-2-hydroxynaphthalene, 8-ethylsulphonylamino-2-hydroxynaphthalene, 4-methylphenol, 4-amylphenol, 2- or 3-acetylamino-4-methylphenol, 2-methoxycarbonylamino-4-methylphenol, 2-benzoylamino-4-methylphenol, 2-(p-methylbenzoylamino)-4-methylphenol, 3,4-dimethylphenol and 2,4-dimethylphenol.

Examples of suitable amines of the formula (5) are: 2-amino-1-hydroxybenzene-4-sulphonamide, 2-amino-1-hydroxybenzene-4-N-methylsulphonamide, 2-amino-1-hydroxybenzene-4-N,N-dimethylsulphamide, 2- amino-1-hydroxybenzene-4-N-β-hydroxyethylsulphonamide, 2-amino-1-hydroxybenzene-4-N-phenylsulphonamide, 2-amino-1-hydroxybenzene-4-N-β-cyanoethylsulphonamide, 2-amino-1-hydroxybenzene-4-N-cyclohexylsulphonamide, 2-amino-1-hydroxybenzene-4-N-benzylsulphonamide, 2-amino-1-hydroxybenzene-4-methylsulphone, 2-amino-1-hydroxybenzene-4-chloromethylsulphone, 2-amino-1-hydroxybenzene-4-ethylsulphone, 2-amino-1-hydroxybenzene-4-phenylsulphone, 2-amino-1-hydroxybenzene-4-p-chlorophenylsulphone, 2-amino-1-hydroxybenzene-4-p-methylphenylsulphone, 2-amino-1-hydroxybenzene-4-benzylsulphone.

Examples of suitable aldehydes of the formula (6) are: 2-hydroxybenzaldehyde, 3- and 5-methyl-2-hydroxybenzaldehyde, 3,5- and 3,6-dimethyl-2-hydroxybenzaldehyde, 5-butyl-2-hydroxybenzaldehyde, 5-chloro- or 5-bromo-2-hydroxybenzaldehyde, 5-chloro-2-hydroxybenzaldehyde, 3,5-dichloro-2-hydroxybenzaldehyde, 3-chloro-5-methyl- and 3-methyl-5-chloro-2-hydroxybenzaldehyde, 3- and 4- and 5-nitro-2-hydroxybenzaldehyde, 3,5- dinitro- and 4-chloro-5-nitro-2-hydroxybenzaldehyde, 1-hydroxy-2-naphthaldehyde and its derivative which is chlorinated in 4-position, and 2-hydroxy-1-naphthaldehyde.

Azomethine dyes of the formula (4), which are substituted in the aldehyde component by an arylazo group, are obtained by coupling an aromatic diazonium compound to an o-hydroxyaldehyde in known manner and condensing the resultant arylazo-hydroxyaldehyde with amines of the formula (5).

The conversion of the monoazo dye of the formula (3) or of the azomethine dye of the formula (4) into the 1:1 chromium complex is accomplished by conventional methods which are known per se, e.g. by reacting it in an acid medium with a salt of trivalent chromium, e.g. chromium, formate, chromium sulphate, chromium chloride hexahydrate or chromium fluoride, at boiling temperature or optionally at temperatures exceeding 100° C. Trivalent chromium can also be obtained in known manner from chromium-(VI) compounds, e.g. chromate, by adding a reducing agent, e.g. butanol, to the reaction mixture. In general, it is advisable to carry out the metallising for example in the presence of organic solvents, such as alcohols or ketones.

It is normally advantageous not to dry the starting dyes required in the present process after their manufacture and precipitation, but to process them further as a moist paste.

The reaction of the 1:1 chromium complex of the dye of the formula (3) or (4) with the metal-free dye of the formula (4) or (3), or the single step reaction between a 1:1 chromium complex of a dye of the formula (3), an amine of the formula (5) and an aldehyde of the formula (6), is desirably carried out in a neutral to weakly alkaline medium, in an open or a sealed vessel, and at normal or elevated temperature, e.g. at temperatures between 50° and 120° C. The process can be carried out in organic solvents, e.g. alcohols or ketones or in an aqueous solution, in which case the addition of solvents, e.g. alcohols, formamide etc., can promote the reaction if so desired. It is usually advisable to react as far as possible equivalent amounts of the chromium-containing 1:1 complex and the metal-free dye, the molecular ratio between metal-free dye and 1:1 complex being desirably at least 0-85:1 and at most 1:0.85. A surplus of metal-containing dye is usually less disadvantageous than one of metal-free dye. The closer this ratio is to 1:1 the more advantageous the result generally is.

The novel chromium-containing mixed complexes obtained by the above processes are isolated with advantage in the form of their salts, in particular alkali salts, above all sodium salts, or also ammonium salts or salts of organic amines with positively charged nitrogen atoms, and are suitable for dyeing and printing the most varied materials, but cheifly for dyeing materials made from natural polyamides, such as silk, wool, and leather, but mainly for dyeing and printing synthetic polyamide fibres, e.g. fibres made from polyamides or polyurethanes. They are readily soluble in water, above all in the form of their alkali salts, and are suitable for dyeing from a neutral or weakly acid bath, for example from an acetic acid bath.

The novel dyes have good affinity for both natural and synthetic polyamide and produce level dyeings of good fastness properties (fastness to light, washing, water, perspiration, fulling, decatising, carbonising, alkali, acid and rubbing). The good wet fastness properties are to be particularly high lighted, especially the fastness to fulling, water and perspiration.

It is to be understood that the simple hexagon and the fused hexagons appearing in the specification and examples represent the phenyl and naphthyl ring, respectively, unless otherwise indicated.

The following Examples illustrate the invention, the parts and percentages being by weight unless otherwise stated.

EXAMPLE 1

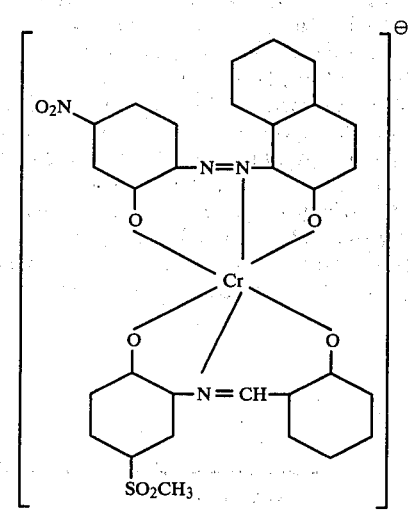

30.9 parts of the monoazo dye obtained from diazotised 5-nitro-2-amino-1-hydroxybenzene and 2-hydroxynaphthalene are dissolved in 500 parts by volume of n-butanol. After addition of 26.65 parts of chromium chloride hexahydrate, the mixture is stirred at 100°–115° C. and the water which forms is removed as an azeotrope. The chroming is terminated after 1 to 2 hours.

The solution of the 1:1 chromium complex is then treated with 18.7 parts of 2-amino-1-hydroxybenzene-4-methylsulphone, 12.2 parts of salicylaldehyde and 30 parts of calcined sodium carbonate and stirring is continued for a further 1–2 hours at 110°–117° C. A dark powder is obtained which dissolves extremely well in water to give an olive green solution and which dyes wool or polyamide material from a neutral to weakly acid bath in olive green shades of generally good fastness properties and good fastness to light.

EXAMPLE 2

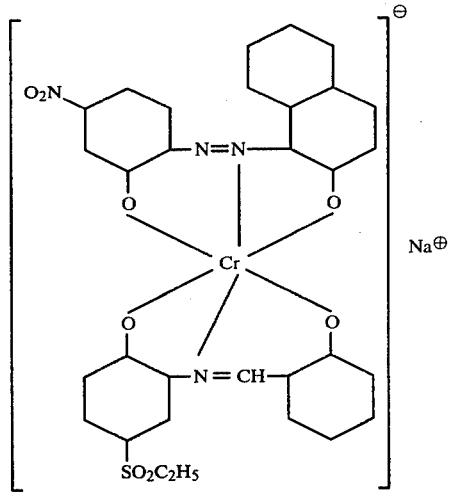

30.9 parts of the monoazo dye obtained from diazotised 5-nitro-2-amino-1-hydroxybenzene and 2-hydroxynaphthaline together with 26.65 parts of chromium chloride hexahydrate are stirred in 500 parts by volume of ethylene glycol at 120°–125° C. until the starting compound can no longer be detected. The solution of the 1:1 chromium complex dye is then treated with 20.1 parts of 2-amino-1-hydroxybenzene-4-ethylsulphone, 12.2 parts of salicylaldehyde and 80 parts by volume of sodium carbonate solution (20%) and stirring is continued for a further 1 to 2 hours at 80°–85° C. (to effect the addition of the azomethine dye). Upon termination of the reaction, the asymmetrical chromium-containing dye is precipitated by addition of saturated sodium chloride solution, filtered off and dried. The product is a dark powder which dissolves to give an olive freen solution in water and dyes wool or polyamide material as well as leather from a weakly acid bath in olive green shades of generally good fastness properties.

EXAMPLE 3

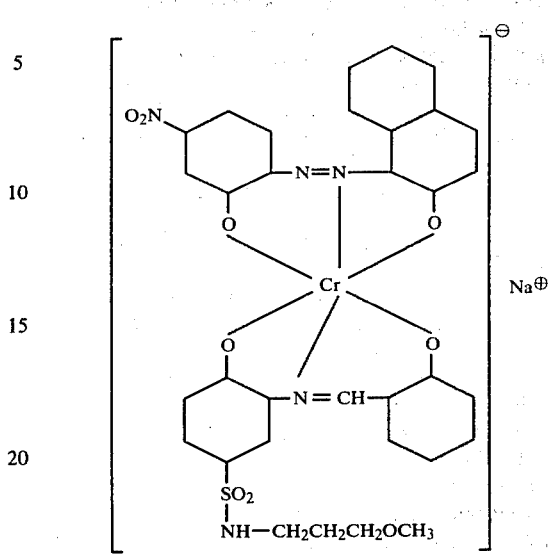

30.9 parts of the monoazo dye obtained from diazotised 5-nitro-2-amino-1-hydroxybenzene and 2-hydroxynaphthalene are dissolved in 400 parts by volume of methyl isobutyl ketone. Upon addition of 26.65 parts of chromium chloride hexahydrate, the mixture is stirred for 1 to 2 hours at 105° C.–117° C. and the water which forms is removed as an azeotrope. The dye solution is then treated with 30 parts of calcined sodium carbonate, 26 parts of 2-amino-1-hydroxybenzene-4-sulph-δ-methoxypropylamide, 12.2 parts of salicylaldehyde, and stirring is continued for a further 1 to 2 hors at 110°–117° C. Upon termination of the reaction, the reaction mixture is filtered clear and the dye solution is evaporated to dryness to yield a dark powder which dissolves readily in water to give an olive freen solution and dyes wool and polyamide material in olive green shades of very good fastness properties. By carrying out the procedure as described in Examples 1 to 3, but using equivalent amounts of the 1:1 chromium complexes and azomethine dyes listed in the table, 1:2 chromium complex dyes are obtained which dye wool and polyamide in the shades indicated in the last column of the table with similarly good fastness properties.

Table

| No. | (1:1) Chromium complex from: | Azomethine dye | Shade |
|---|---|---|---|
| 1. | ![structure with OH, N=N, NO2, naphthalene] | ![structure with OH, N=CH, SO2NH2] | olive green |
| 2. | ![structure with OH, N=N, NO2, naphthalene] | ![structure with OH, N=CH, SO2NHCH3] | " |

Table-continued
| No. | (1:1) Chromium complex from: | Azomethine dye | Shade |
|---|---|---|---|
| 3. | 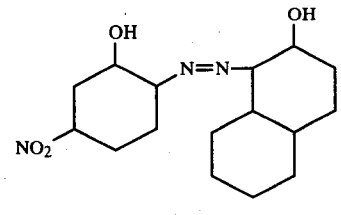 | 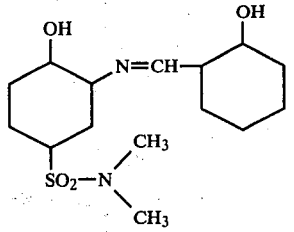 | " |
| 4. | 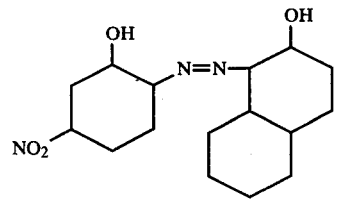 | 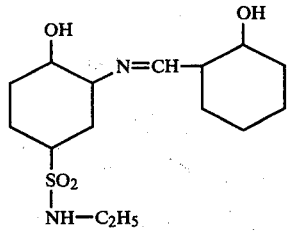 | " |
| 5. | 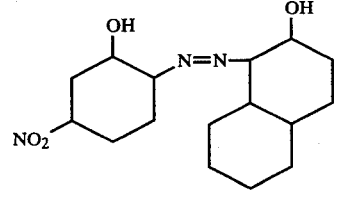 | 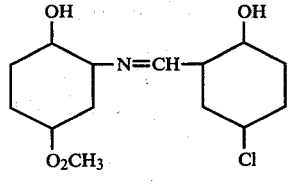 | " |
| 6. | 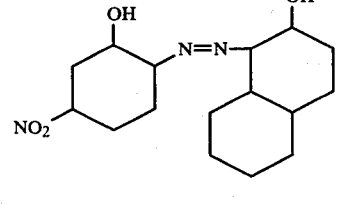 | 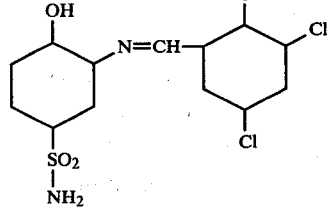 | " |
| 7. | 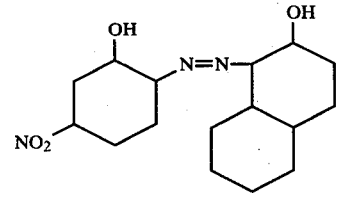 | 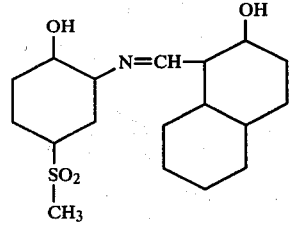 | " |
| 8. | 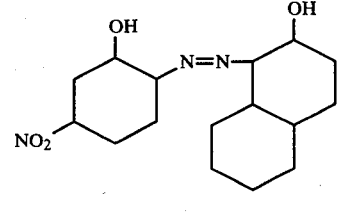 | 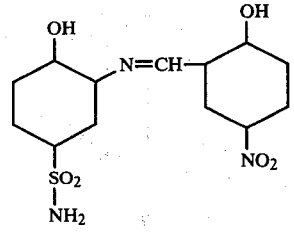 | " |
| 9. | 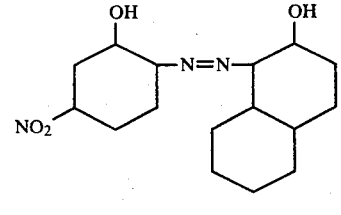 | 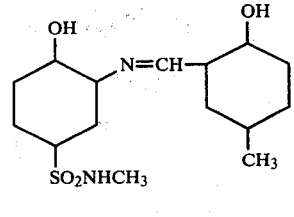 | " |

Table-continued

| No. | (1:1) Chromium complex from: | Azomethine dye | Shade |
|---|---|---|---|
| 10. | (structure: OH, N=N, OH, Cl) | (structure: OH, N=CH, OH, SO₂CH₃) | brown |
| 11. | (structure: OH, N=N, OH, NO₂) | (structure: OH, N=CH, OH, SO₂NHCH₃) | " |
| 12. | (structure: OCH₃, N=N, OH, OCH₃) | (structure: OH, N=CH, OH, SO₂NHC₂H₅) | olive green |
| 13. | (structure: HN-COCH₃, OH, N=N, OH, NO₂, HN-COCH₃) | (structure: OH, N=CH, OH, SO₂CH₃) | olive |
| 14. | (structure: OH, N=N, OH, NO₂, HN-COCH₃) | (structure: OH, N=CH, OH, SO₂C₂H₅) | " |
| 15. | (structure: OH, N=N, OH, NO₂, HN-COOCH₃) | (structure: OH, N=CH, OH, SO₂N(CH₃)₂) | " |
| 16. | (structure: OH, N=N, OH, NO₂, CH₃, CH₃) | (structure: OH, N=CH, OH, SO₂-N(morpholine)) | brown |
| 17. | (structure: OH, N=N, OH, NO₂, C₅H₁₁) | (structure: OH, N=CH, OH, SO₂-cyclohexyl-SO₂NH₂) | " |

Table-continued

| No. | (1:1) Chromium complex from: | Azomethine dye | Shade |
|---|---|---|---|
| 18. | | | " |
| 19. | | | " |
| 20. | | | olive grey |
| 21. | | | brown |
| 22. | | | " |
| 23. | | | olive |
| 24. | | | " |

Table-continued

| No. | (1:1) Chromium complex from: | Azomethine dye | Shade |
|---|---|---|---|
| 25. | | | " |
| 26. | | | " |
| 27. | | | " |
| 28. | | | olive green |
| 29. | | | brown |
| 30. | | | olive green |
| 31. | | | " |

Table-continued

| No. | (1:1) Chromium complex from: | Azomethine dye | Shade |
|---|---|---|---|
| 32. | [structure: OH, OH, N=N, O2N, naphthalene] | [structure: OH, OH, O2N, N=CH, SO2CH3] | " |
| 33. | [structure: OH, OH, N=N, O2N, N(CH3)2] | [structure: OH, OH, N=CH, SO2CH3] | olive |
| 34. | [structure: OH, HO, N=N, O2N, naphthalene] | [structure: OH, OH, N=CH, SO2-NH-CH2CH2OCH3] | olive green |

PROCEDURE FOR DYEING WOOL

2 Parts of the chromium-containing dye according to Example 1 are dissolved in 4000 parts of water and 100 parts of thoroughly moistened wool are put into this dyebath at 40°–50° C. Then 2 parts of 40% acetic acid are added and the bath is heated to the boil over the course of ¼ hour and kept for ¾ hour at boiling temperature. The wool is then rinsed with cold water and dried. The olive green dyeing is characterised by good wet fastness properties and by excellent light fastness.

PROCEDURE FOR DYEING POLYAMIDE

100 Parts of nylon 66 fabric are put at 50°–60° C. into a dyebath consisting of 3000 parts of water, 4 parts of 40% acetic acid, 10 parts of sodium sulphate and 2 parts of the chromium complex of Example 1. After the bath has been heated to the boil over the course of ½ hour, dyeing is carried out for a further hour at boiling temperature. The material is rinsed and dried and a level, olive green dyeing is obtained.

What is claimed is:

1. A 1:2 chromium complex dye of the formula

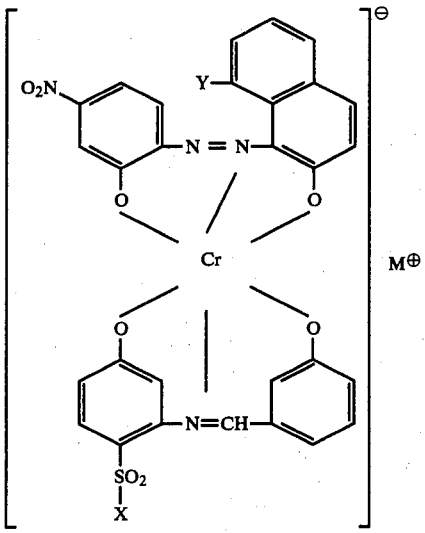

wherein
X represents methyl, ethyl, chloromethyl, NH2, methylamino, dimethylamino, ethylamino, diethylamino, isopropylamino, or methoxyethylamino,
Y represents hydrogen, lower alkanoylamino, lower alkoxycarbonylamino or benzoylamino, and
M⊕ is a cation.

* * * * *

UNITED STATES PATENT AND TRADEMARK OFFICE
CERTIFICATE OF CORRECTION

PATENT NO. : 4,219,473
DATED : August 26, 1980
INVENTOR(S) : Fabio Beffa and Eginhard Steiner It is certified that error appears in the above-identified patent and that said Letters Patent are hereby corrected as shown below:

Cover page, column 1 should read

-- [30] Foreign Application Priority Data

Dec. 7, 1973 [CH] Switzerland..........17195/73--.

Signed and Sealed this

Tenth Day of February 1981

[SEAL]

Attest:

RENE D. TEGTMEYER

Attesting Officer    Acting Commissioner of Patents and Trademarks